June 7, 1966 P. BERSANO 3,255,070
MACHINE AND PROCESS FOR MAKING WOOD PULP
Filed July 25, 1961 11 Sheets-Sheet 1
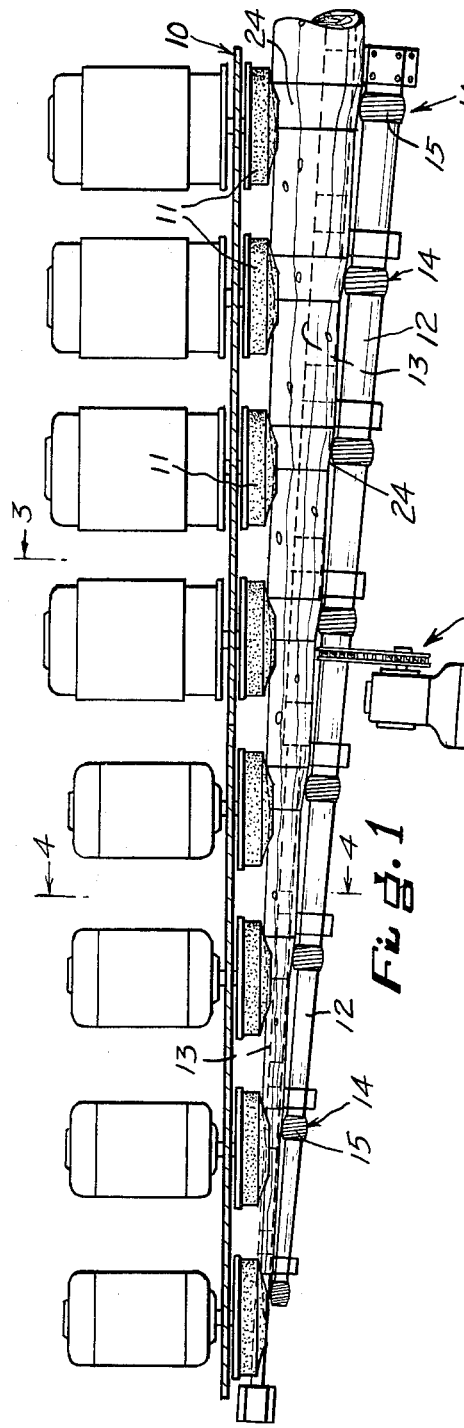
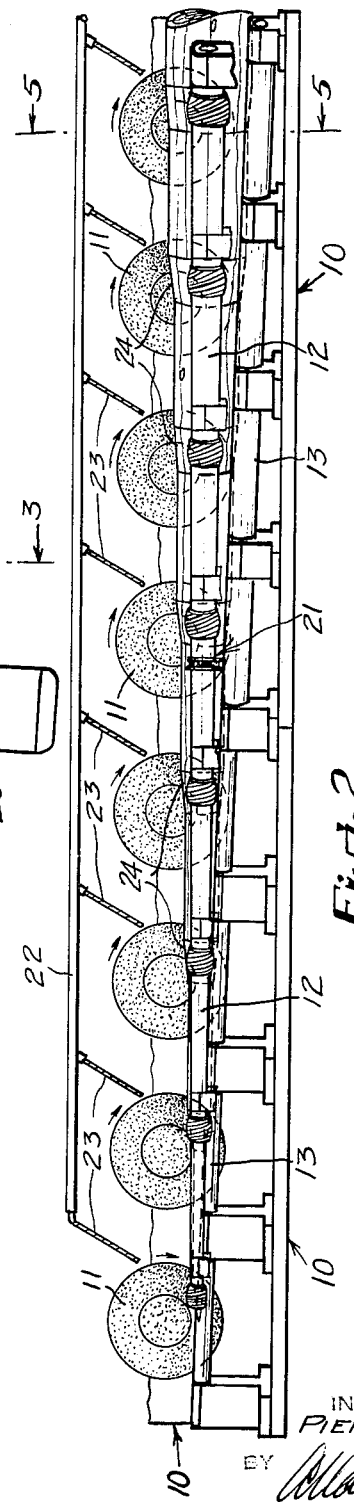
INVENTOR
PIERO BERSANO
BY
ATTORNEY June 7, 1966 P. BERSANO 3,255,070
MACHINE AND PROCESS FOR MAKING WOOD PULP
Filed July 25, 1961 11 Sheets-Sheet 2
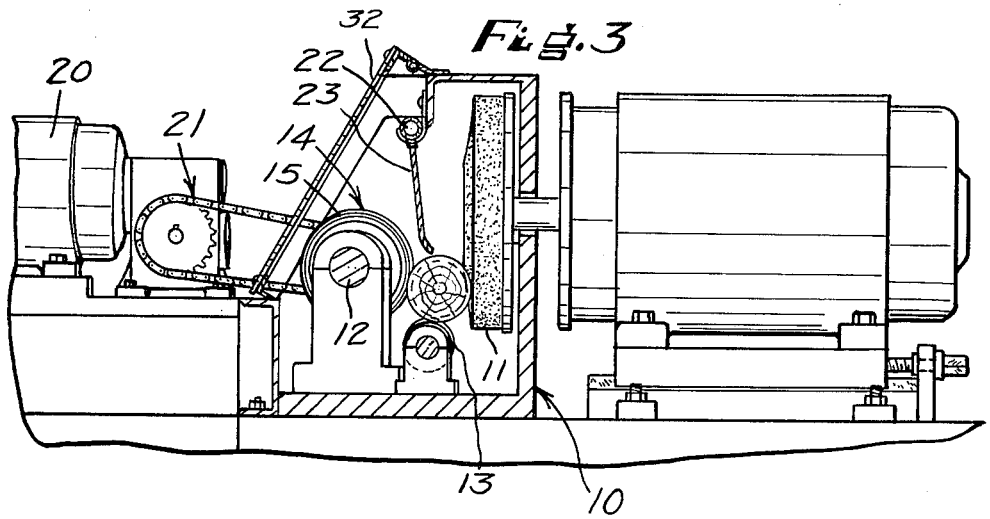
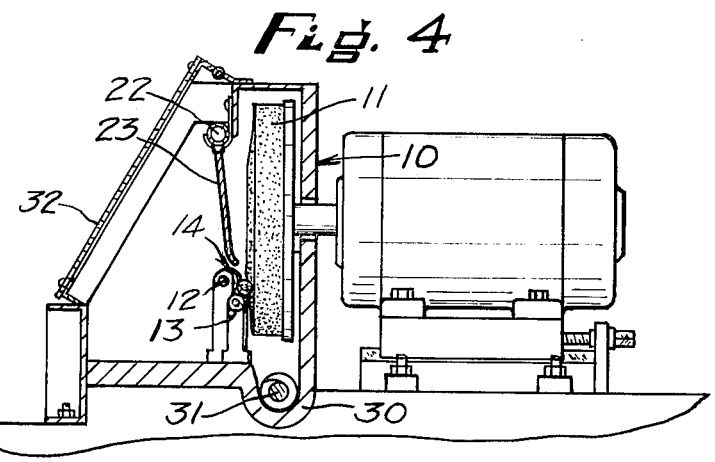
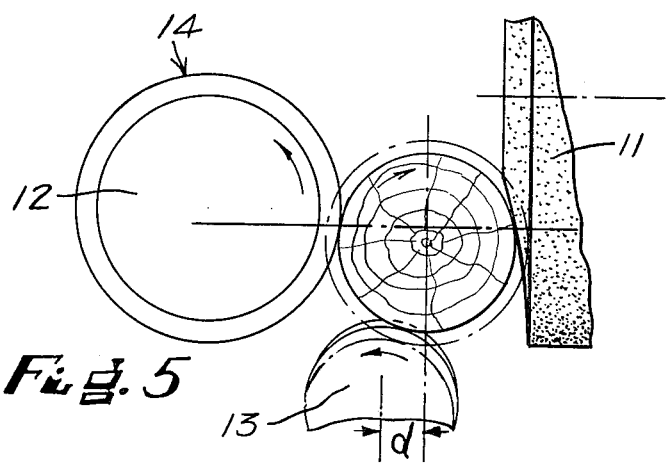
INVENTOR
PIERO BERSANO
BY
ATTORNEY

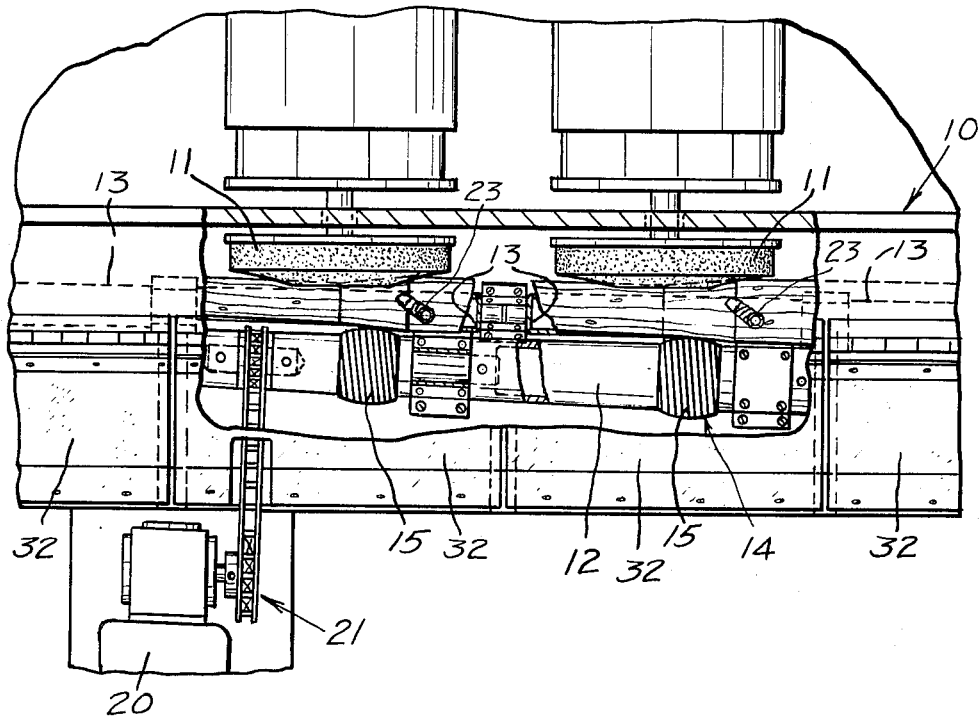
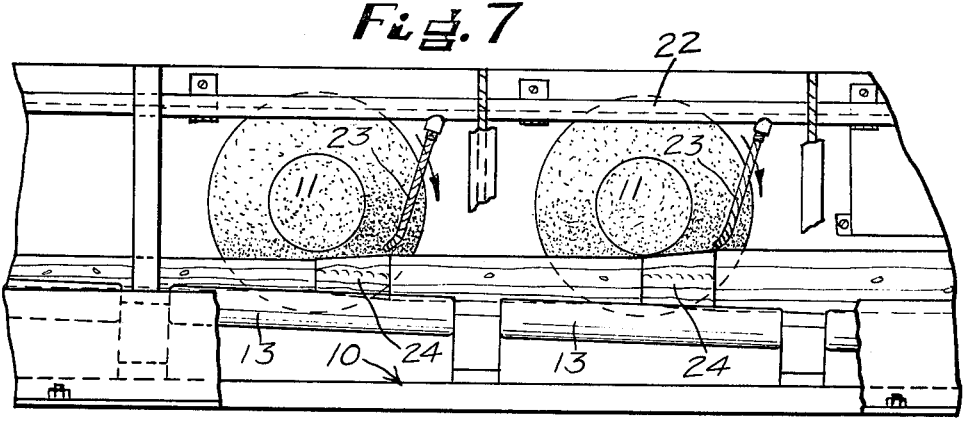
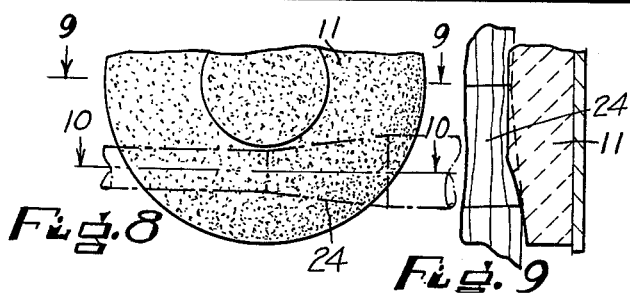
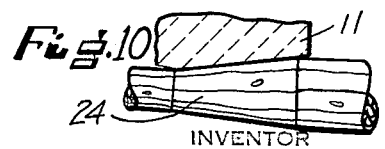
INVENTOR
PIERO BERSANO
BY
ATTORNEY

INVENTOR
PIERO BERSANO
BY
ATTORNEY

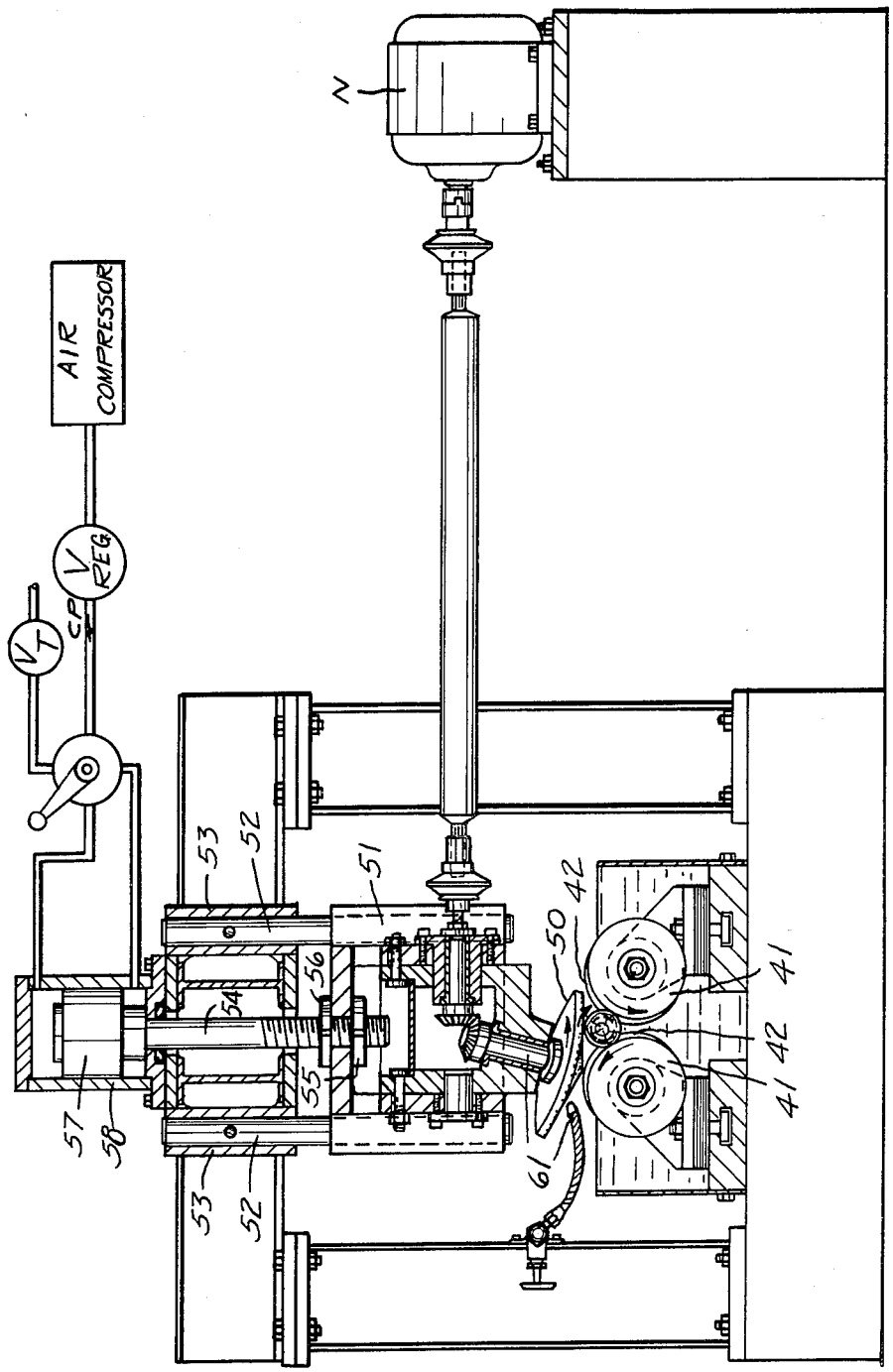

June 7, 1966 P. BERSANO 3,255,070
MACHINE AND PROCESS FOR MAKING WOOD PULP
Filed July 25, 1961 11 Sheets-Sheet 6

INVENTOR
PIERO BERSANO
BY
ATTORNEY

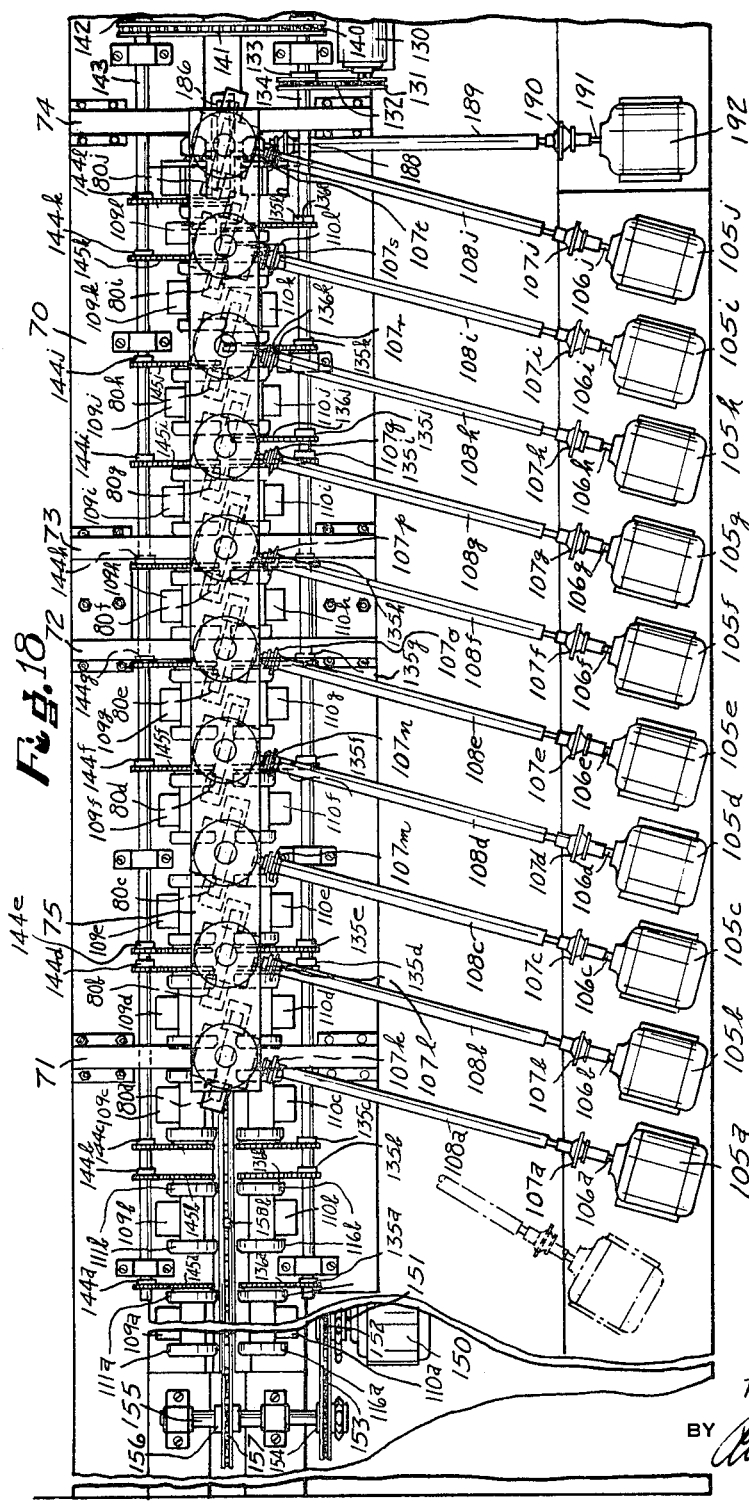

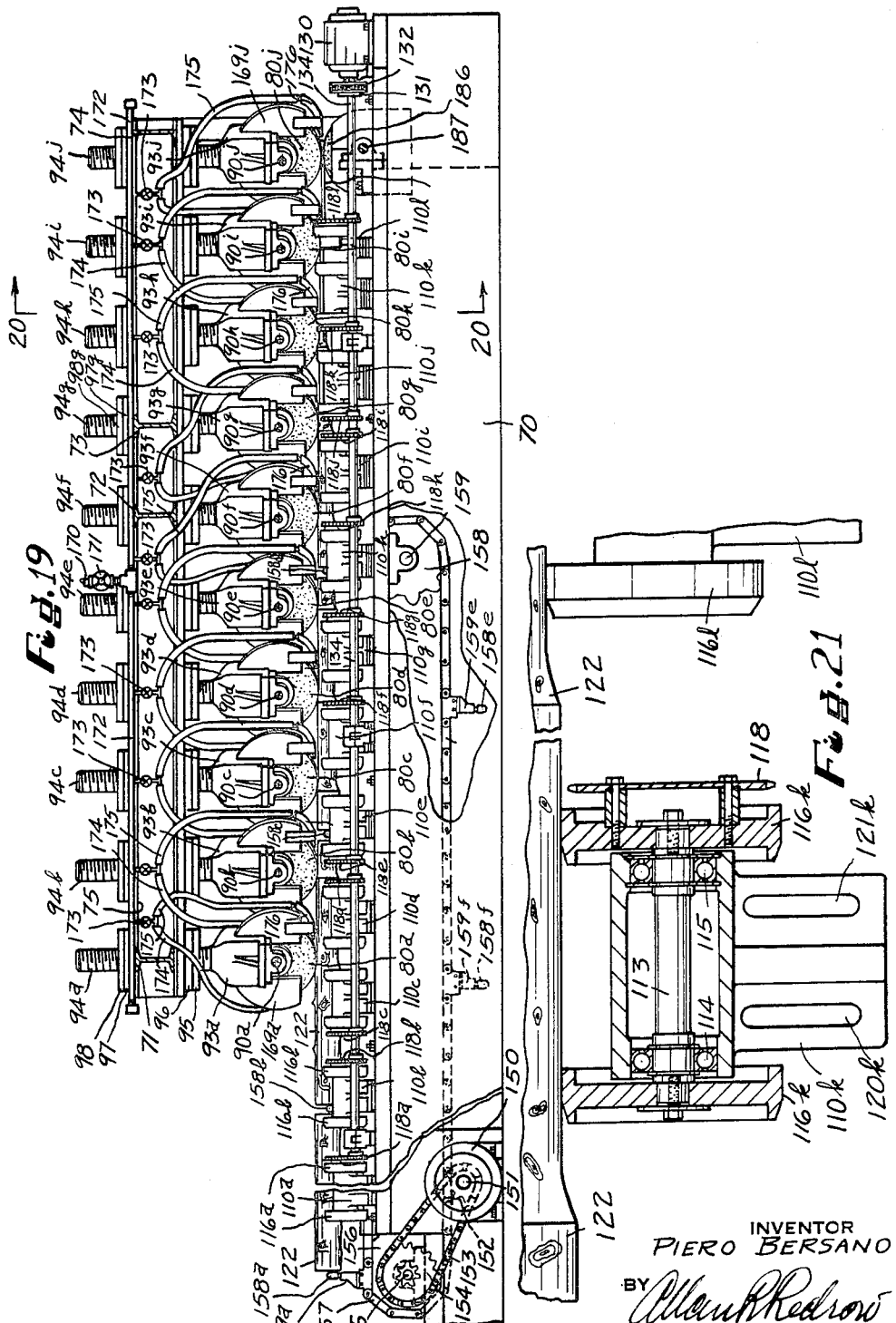

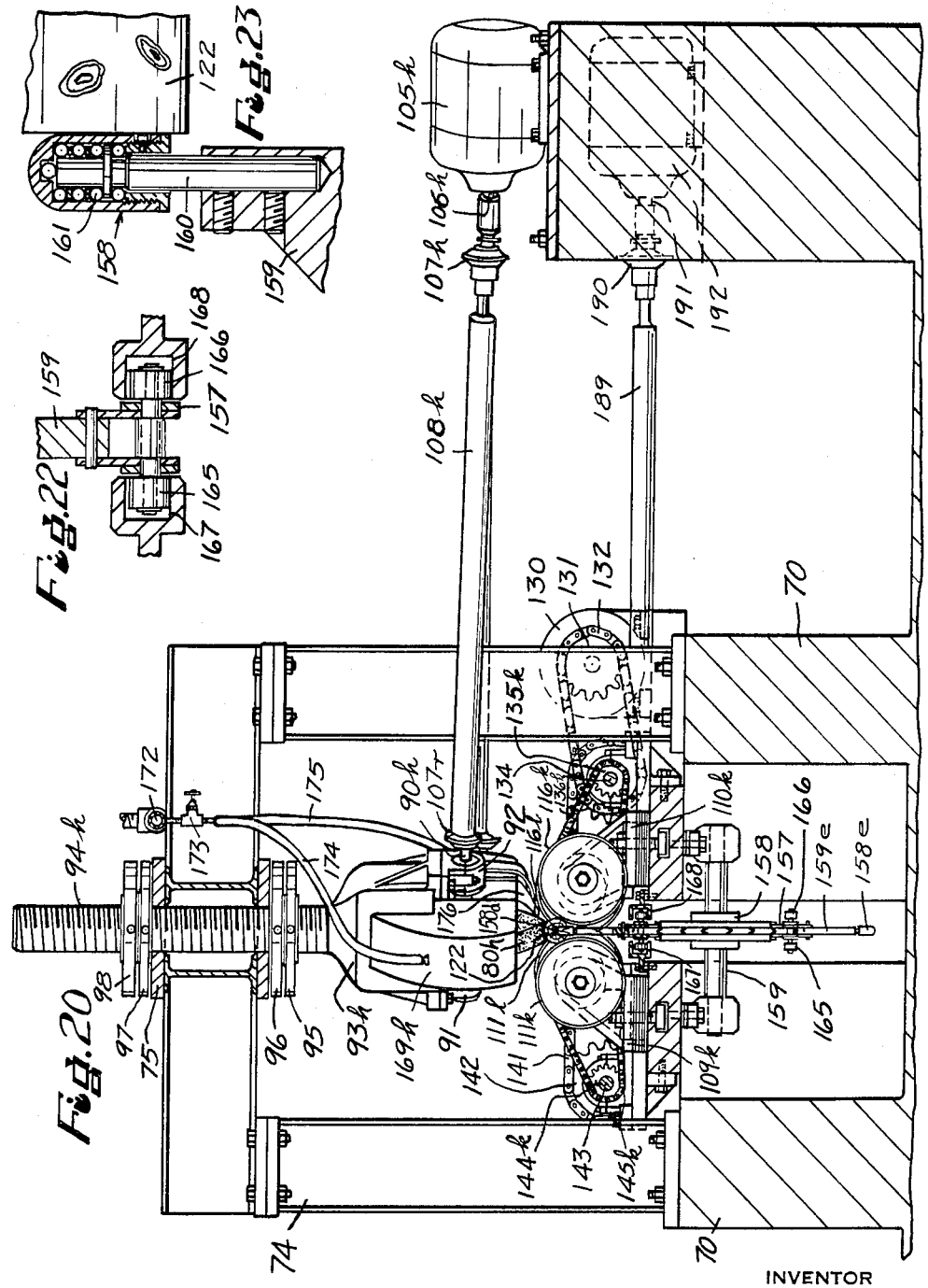

June 7, 1966 P. BERSANO 3,255,070
MACHINE AND PROCESS FOR MAKING WOOD PULP
Filed July 25, 1961 11 Sheets-Sheet 10
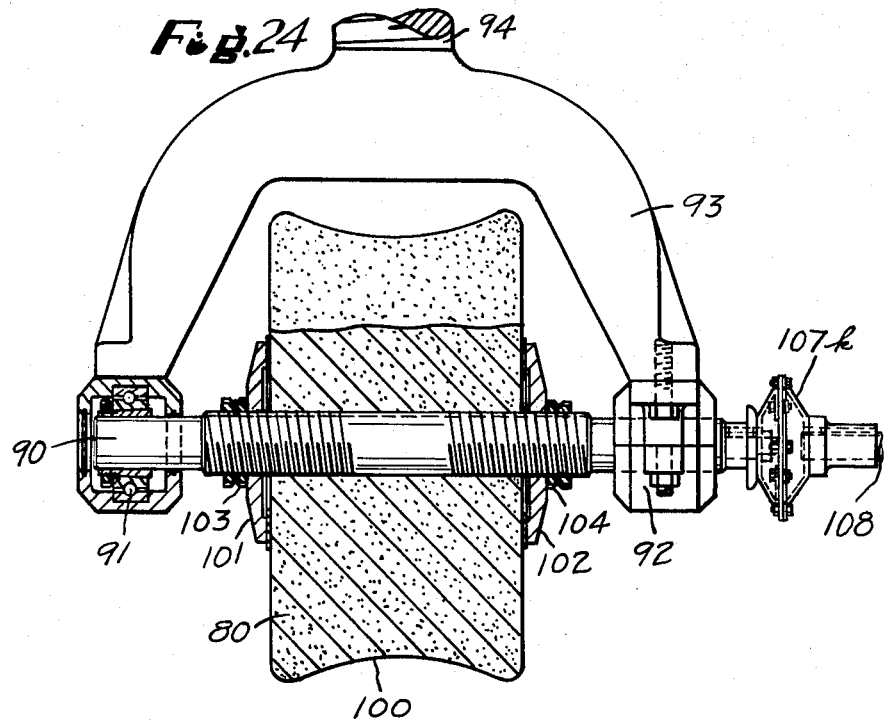
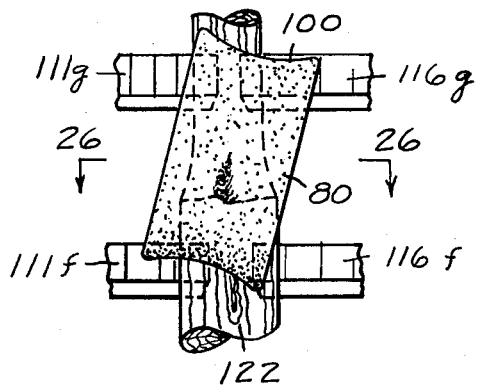
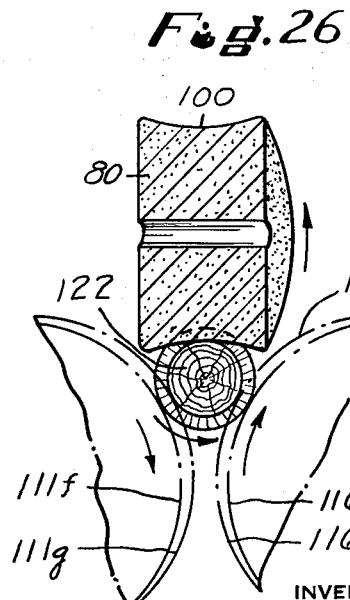
INVENTOR
PIERO BERSANO
BY
ATTORNEY June 7, 1966 P. BERSANO 3,255,070
MACHINE AND PROCESS FOR MAKING WOOD PULP
Filed July 25, 1961 11 Sheets-Sheet 11
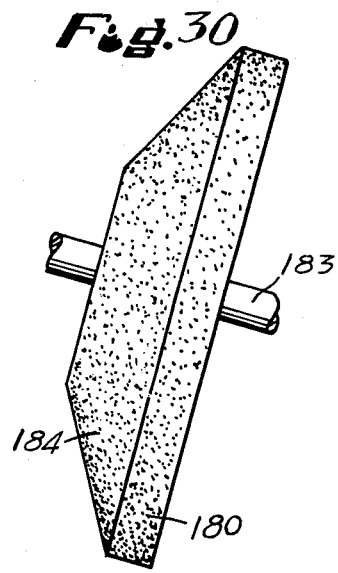
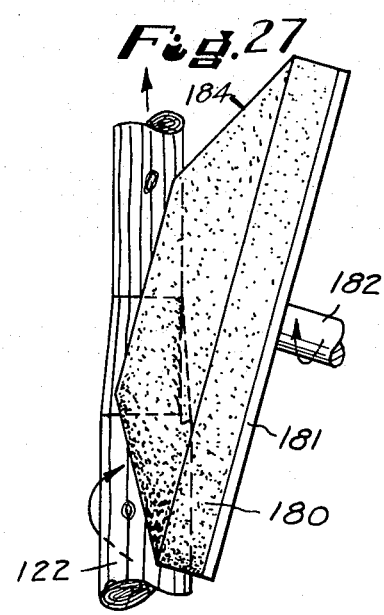
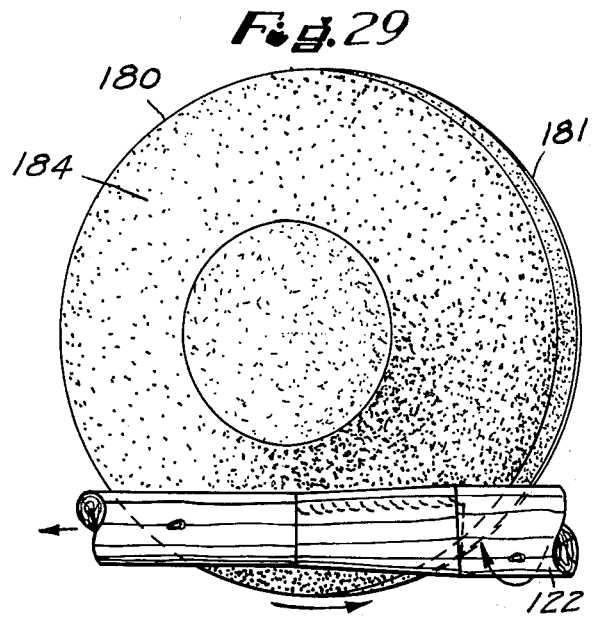
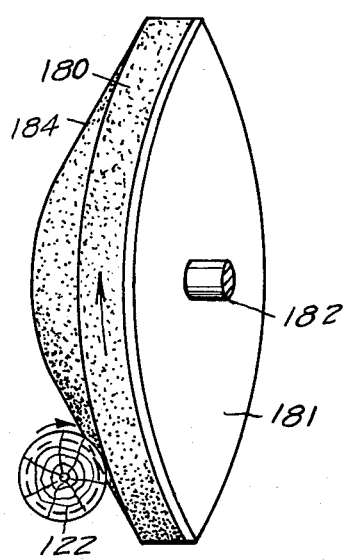
INVENTOR
PIERO BERSANO
BY 
ATTORNEY

United States Patent Office 3,255,070
Patented June 7, 1966

3,255,070
MACHINE AND PROCESS FOR MAKING WOOD PULP
Piero Bersano, Turin, Italy, assignor to Norton Company, Worcester, Mass., a corporation of Massachusetts
Filed July 25, 1961, Ser. No. 126,668
17 Claims. (Cl. 162—26)

This application is a continuation-in-part of my earlier filed copending applications S.N. 696,178 filed November 13, 1957, and S.N. 759,965 filed September 9, 1958, both entitled "Pulp Grinding Machine" and both of which are now abandoned.

This invention relates to a wood pulp grinding machine and the method of producing pulp. More particularly it relates to a mechanical abrading means and improved process for conditioning the surface of the logs for shredding to produce a pulp for use in paper making or the like.

One object of the invention is to provide a simple and thoroughly practical grinding machine for more economically producing relatively long wood fibers for use in the manufacture of paper and paper products. Another object is to produce wood fibers of maximum length. Another object is to disintegrate the log being ground into strings or bundles of fibers thereby producing a pulp of longer unbroken fibers of better quality.

Another object is to flood the grinding wheel and/or impregnate the surface of the log being ground with a chemical solution to facilitate dissolving or softening the binding lignins and resins so as to remove strings or bundles of unbroken fibers during the grinding operation. Another object is to flood the grinding wheel and the log being ground with a chemical solution with a suitable pressure so that the action of the fluid assists in the removing of strings and bundles of unbroken relatively long fibers.

Another object is to provide a wood pulp grinder in which the logs to be ground are fed axially through a grinding throat between a grinding wheel and a work support. A further object is to provide a centerless wood pulp grinding machine in which logs of random lengths are fed in an axial direction.

Another object, in one form of the machine, is to provide either a straightfaced, a hyperboloid-shaped, or a conically-shaped grinding wheel which is arranged to be skewed at an angle of from 10° to 25°, preferably 15°, relative to the axis of the logs being ground so that the grinding wheel removes bundles of fibers in a helical path as the logs are rotated and fed axially through the machine.

Another object is to provide a single pair or a plurality of spaced pairs of rotatable rollers for supporting the logs during grinding. Another object is to provide a positive drive for at least one roller of each pair of the work supporting rollers to positively rotate the logs as they are fed axially through the machine.

Another object is to provide a power driven mechanism for imparting an axial feeding movement to the logs being ground at a controlled rate through the grinding throat. Another object is to provide means varying the rate of axial feed of the logs through the machine so as to control the depth of cut, and thereby to control the rate of grinding.

Another object is to provide a pulp grinding machine in which the skewed angle of the grinding wheel, the rate of axial feed and the rate of rotation of the work supporting rollers determines the grinding action.

A further object is to provide a processing machine for producing wood fibers economically from hard woods such as beech, birch, maple, etc., and also from poplar, eucalyptus, as well as softwoods without the necessity of previous chemical treatment of the logs. A further object is to provide a pulp grinding machine employing smaller and less expensive grinding wheels and operating at greatly reduced power to produce pulp at a lower cost.

In my first filed application, it is proposed to shred logs in a novel manner with grinding wheels to produce wood fiber pulp. This is my prior application No. 696,178, filed September 13, 1957, for Pulp Grinding Machine, wherein the logs to be converted into pulp are fed axially through a plurality of stations where they are forced into contact with suitable abrasive grinding wheels. At each station the periphery of the log is subjected to a mechanical grinding action to shred the log so that fibers are loosened which may be used, for example, in the production of paper.

The invention disclosed in S.N. 759,965, filed September 9, 1958, for Pulp Grinding Machine, operates on a similar principle and provides an improved grinding action for effecting separation of the fibers from the log whereby the fibers are produced more economically and have a better quality for paper formation. In this form of the invention, I make use of conically shaped wheels which are disposed to act upon a log moving axially through the machine in such a manner that the conical grinding wheels not only serve to abrade the surface of the log but also compress the surface of the log and further act against the surface to cause a rotation of the log as well as to impart an axial feeding force thereto. The coaction between the grinding wheel and the surface of the log is such that the fibers are separated from the log by means of a pulling action lengthwise along the surface in a direction which is a component of the rotation of the log, the rotation of the grinding wheel and the axial feed of the log such that the fibers tend to be separated without being broken and thus a higher percentage of longer and unbroken fibers results.

The improvements added in this continuation-in-part application incorporate refinements made upon the machines shown in each of my two above mentioned applications. The machine as shown in its latest form incorporates improved log supporting structures therein for effecting the desired axial and rotational feed motions. The grinding action has also been modified and improved upon, this action being coupled with the compression and decompression of the surface of the log in the presence of water with or without added chemicals, to effect fiber removal. Further the machine here shown provides for an improved pulp removal system that is especially serviceable for handling pulp of a relatively much higher consistency such as may be produced by practicing a combined chemical and mechanical fiber shredding or separation process.

Many other features of the invention are made apparent in the more detailed description below, and are illustrated in the embodiments shown in the drawings wherein:

FIG. 1 is a top plan view of the preferred form of my machine with the casing partly broken away;

FIG. 2 is a side elevation of the machine of FIG. 1;

FIG. 3 is a view taken on line 3—3 of FIG. 1;

FIG. 4 is a view taken on line 4—4 of FIG. 1, showing an alternate pulp removal means;

FIG. 5 is a diagrammatic view taken on line 5—5 of FIG. 2, showing a typical grinding wheel, log and roller support relationship as the log leaves a grinding station in the machine of FIG. 1;

FIG. 6 is a detailed top plan view of two typical grinding stations of the machine of FIG. 1, with the casing partly broken away;

FIG. 7 is a side elevation of the section of the machine shown in FIG. 6;

FIG. 8 is a side elevation of a grinding wheel adapted to be used in the machine of FIG. 1;

FIG. 9 is a view taken on line 9—9 of FIG. 8;

FIG. 10 is a view taken on line 10—10 of FIG. 8;

FIG. 12 is an end elevation taken on line 12—12 of FIG. 11 looking from the infeed end of the machine toward the exit end;

Figure 11:
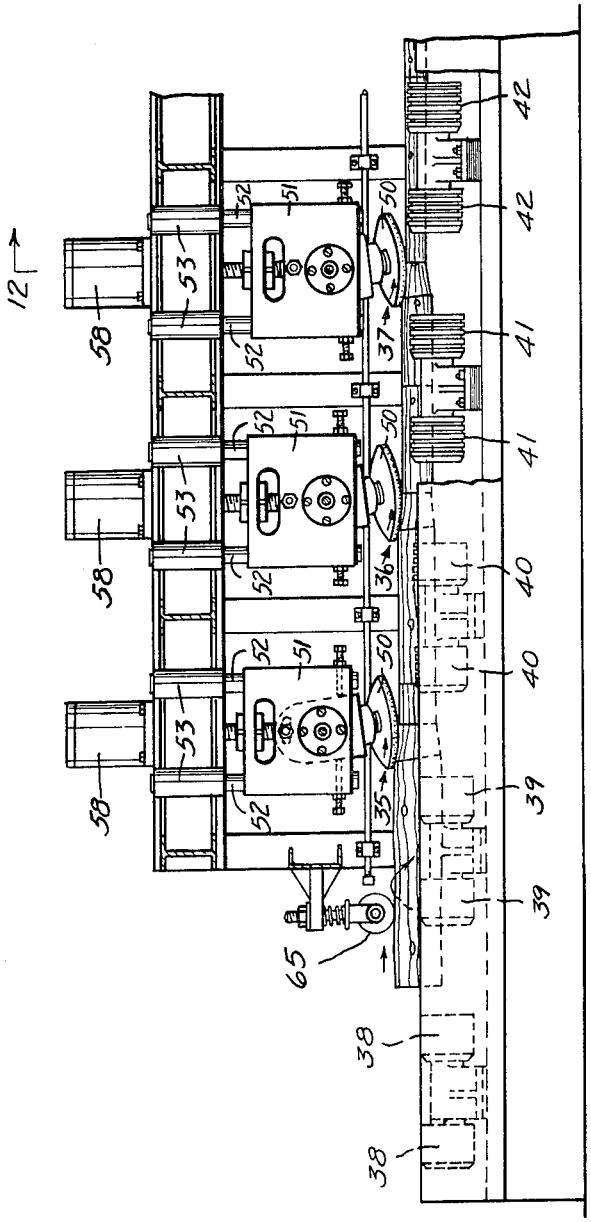
FIG. 11 is a side elevation of several grinding stations another form of a machine adapted to make use of conical grinding wheels as here taught.
Figure 17:
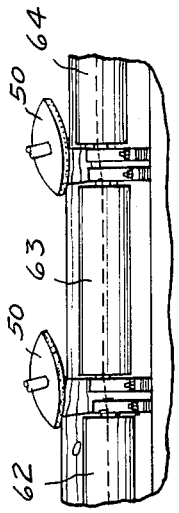
Figure 14:
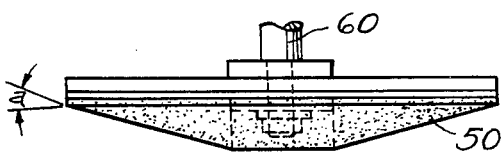
Figure 15:
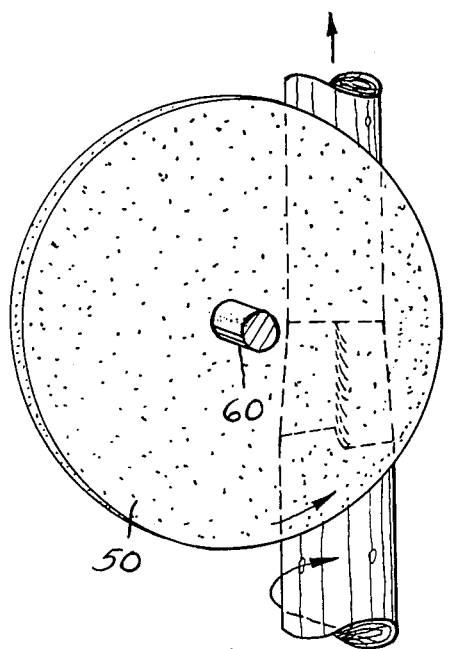

FIGS. 13, 14, 15, and 16 are diagrammatic views showing the preferred angular relationships of the surfaces of the conical grinding wheels and the position of these wheels relative to the surface of the log being worked upon;

FIG. 17 is a view of a modified support roller means for the machine shown in FIG. 11 and its relation to the two adjacent grinding stations;

FIG. 18 is a fragmentary plan view of still another form of the pulp grinding machine of this invention;

FIG. 19 is a fragmentary side elevation of the machine of FIG. 18;

FIG. 20 is a vertical sectional view, on an enlarged scale, taken approximately on the line 20—20 of FIG. 19;

FIG. 21 is a fragmentary horizontal sectional view, on an enlarged scale, through one of the sets of work supporting and driving rollers of this form of the machine;

FIG. 22 is a fragmentary cross sectional view, on an enlarged scale, through the log traversing chain;

FIG. 23 is a fragmentary vertical sectional view, on an enlarged scale, through one of the log traversing members;

FIG. 24 is a fragmentary elevation, on an enlarged scale, of one of the hyperboloid pulp grinding wheels of this form of the machine showing the spindle and bearings therefor;

FIG. 25 is a diagrammatic plan view, on an enlarged scale, showing one of the wheels of FIG. 24, the log supporting rolls and a log being ground;

FIG. 26 is a vertical sectional view, taken approximately on the line 26—26 of FIG. 25;

FIG. 27 is a diagrammatic plan view of a modified arrangement of grinding wheel for the machine of FIG. 18, showing a log being ground by a conically-shaped grinding wheel;

FIG. 28 is a diagrammatic end view of the log and grinding wheel as shown in FIG. 27;

FIG. 29 is a diagrammatic side elevation of the log and grinding wheel as shown in FIG. 27; and FIG. 30 is a view of a conically-shaped grinding wheel mounted on the wheel spindle shown in FIG. 24.

In making use of the invention disclosed in my earlier filed applications, the logs to be ground into pulp are delivered axially into the machine to pass through a plurality of grinding throats. These earlier disclosures show different feeding arrangements for delivering the logs past the grinding stations as well as other features of the invention. They disclose both a positive control of axial and rotational feed as well as an unrestrained log feed for both axial and rotational movement. In the preferred form of construction and operation of such machines, I have found that the logs should be positively driven to rotate while simultaneously being subjected to the action of a conically shaped grinding wheel. When this is done the grinding surfaces of the wheels may be properly related to the logs to be ground in a manner to best separate individual or bundles of fibers from the logs while each log is being more or less positively urged by axial feed means, to move through the machine. While I do not wish to be limited to the following explanation as to the reason for the improved separation of the fibers in accordance with this teaching, it is believed that the several constructions here disclosed effect first a compression of the surface layer of fibers where the logs are engaged by their support rollers as the logs pass under the grinding wheels which in effect apply pressure to the log, and then a decompression thereof takes place when the compressed surface area portions of the log moves away from the surface of the support means as the log rotates such that in some instances water alone, but in other cases any one of the known chemical solvent solutions, may be flowed over the surface of the log as it is worked at the zone of compression and decompression to dissolve the lignins and other binding elements in the logs which serve to hold the fibers together. The mechanical agitating action produced by compressing and decompressing the wood surface in the presence of such fluid, aids in working the solvent into intimate association with respect to the material to be dissolved so that the lignins and other elements are leached out and the fibers are only loosely bonded when the next adjacent grinding wheel thereafter acts upon the surface to separate the already partially loosened fibers from the log.

The preferred construction of the machine is shown in FIGS. 1 to 9. It has an L-shaped bed 10 adapted to support a plurality of rotatably mounted grinding wheels 11 carried on the upright wall of the bed with the axis of rotation of each wheel generally disposed in the same horizontal plane. Two log supporting rollers 12 and 13 which extend from the inlet end to the exit end of the machine are mounted to engage the log and support it against the grinding pressure produced by the wheels 11. The support roll 12 at spaced intervals, is provided with crowned surfaces 14 disposed opposite respectively, each area where the log contacts a grinding wheel. Roll 12 is driven to, in effect, provide a regulating or log rotation controlling means, to produce a proper relative movement of the log against the grinding wheel to produce the optimum grinding action as the log passes the grinding wheels. The crowned portions 14 of roller 12 are each provided with a spiral cut 15 which engages the surface of the log to provide a spiral feeding effect which cooperates with the axial pull of the wheel on the log to control the longitudinal feeding action of the log as it passes the grinding wheels. The bottom support roller 13 is mounted for free rotation with its axis disposed at such an angle as to provide a succession of grinding throats each smaller than the one ahead, the throats getting progressively smaller as the log passes from the inlet end to the exit end of the machine.

It is important to note that the specific relationship of the various rollers and grinding wheel relative to the axis of the log is an important consideration. The roller 13, for example, is positioned almost vertically under the axis of the log but is displaced slightly to the left of the plane through the log's axis, a distance "d" as shown in FIG. 5. At the succeeding stations to the left, referring to FIGS. 1 and 2, the axis of roller 13 moves upwardly toward the axis of the log and is raised upwardly from inlet to outlet end of the machine a distance sufficient to compensate for the reduction in diameter of the log as it passes each grinding station. Likewise the axis of rotation of roller 12 is spaced closer to the axis of the log and the face of the grinding wheel at the outlet of the machine as compared to its spacing at the inlet end as shown in FIGS. 1 and 2, and the diameter of each crowned portion of roller 12 is reduced in proportion to the reduction in diameter of the log, so that the log, which rotates at the same r.p.m. throughout its passage through the machine, does not slip relative to the surface of the crown surface. Even though the roller 12 is spaced closer to the grinding wheel at the last grinding station, the axis of roller 12 at the last station is still displaced to the left of a vertical plane through the axis of the log to maintain the general relationship shown in FIG. 5. Thus the log is always held at the desired grinding position on the several grinding wheels by the supporting action of rollers 12 and 13.

In this position, referring to FIG. 5, it will be seen that the grinding wheel 11 contacts the log on a line disposed below the axis of rotation of the wheel and above a horizontal plane through the axis of the log. The crowned portion 14 of roller 12 engages the log at a point above said horizontal plane, and roller 13 supports the log from below as described. The grinding wheels 11 are all driven in the direction of the arrows, see FIG. 2, and tend to rotate the log in the direction of the arrow as shown in FIG. 5. The speed of rotation of the log is controlled, however, by the slower moving driven roller 12, as compared with the faster moving grinding wheel 11, following somewhat the action of a centerless type of grinder such as is known in the metal grinding arts.

To accomplish this control function, roller 12 is driven by a motor 20 having a suitable speed reducer and sprocket drive 21 for connecting it to roller 12. Roller 12 is driven at a speed to effect the best fiber separation consistent mainly with the characteristics of the wood, the grinding wheel specifications, and the flushing fluid use. I have found, for example, that when grinding fir logs of about 8″ in diameter, the logs can be reduced to a 1″ stick in 18 grinding stations. I have used grinding wheels with 36 size grits operated at about 1200 r.p.m. while the logs were rotated at about 1000 r.p.m. and had a forward speed of about 5 ft./min. In 8 stations I used 50 H.P. electric motors such as motors 22 to drive grinding wheels 11, at the next 6 stations after the initial diameter of the log has been reduced, I used 25 H.P. motors 23 and in the last 4 stations I used 5 H.P. motors to drive grinding wheels 11 associated therewith at 1200 r.p.m.

As the log rotates in the direction of the arrow in FIG. 2 each log is compressed and decompressed at each grinding station with each revolution of the log as it passes over rollers 13 and 12. Due to the resiliency of the wood forming the log it tends to compress upon contacting each roller and expands at the space in between the rollers while a shower of flushing fluid is supplied from header 22 and nozzles 23. As stated above, such fluid may be either water alone or it may be a fluid that includes a chemical having an ability to dissolve out or react with the wood resins and lignins that bind the wood fibers together in the log. After passing beyond roller 12 the compressed surface of the log expands due to the release of the pressure exerted between the log and the wheels due to the weight of the logs as well as the grinding wheel pressure, and absorption of fluids takes place so that the fibers on the surface are loosened as the lignins are dissolved out so that the fibers are loosened and actually raise up and become puffed away from the surface. Centrifugal force may also aid in the separation of fibers from the surface of the log.

The fibers are treated in this manner to produce this loosened condition of the fibers adjacent to and subjacent the surface of the log as the fibers approach the grinding wheel, and since the fibers are thus substantially freed from firm attachment to the surface of the log by the solvent action of the flushing fluid, they are brushed away from the log's surface rather than being subjected to a grinding or cutting action to effect separation. This makes it possible to separate the loosened fibers with a minimum of cutting action which accounts for the very good condition of the fibers in respect of being long and undamaged. After the bulk of the loosened fibers have been swept from the surface of the log, as the exposed surface of the log engages the grinding wheel thereafter, a good frictional contact is created to effect the necessary axial feed motion in the log while creating the desired pressure against rollers 12 and 13. The frictional engagement between the grinding wheel and the log surface stripped of softened fibers generates the driving force which forces the logs against the spirals 15 on the crowned portion of roller 12 to control the axial feed of the log into the restricted throats to produce the resulting pressure to create the repeated compression and decompression cycles, in a manner whereby the optimum fiber softening, puffing, and separation can be affected under the complete control of relative speeds of grinding wheel and log feed past said wheels 11.

In one form of the machine of this invention, the lower support roll 13 is constructed to be porous to pick up chemical fluids from the pulp bath maintained in the lower portion of the bed 10 or by reason of having a fluid spray on its surface. As a result of the log compression and decompression action described above, the chemicals carried in the pores of such a roller would be sucked out of the porous surface thereof as the decompression action takes place whereby to put more chemicals immediately on the surface of the log as the expansion begins so that the chemicals are sponged from the surface into the portions of the log below the surface to dissolve the lignins to loosen the fibers somewhat below the surface of the log. The fluid and chemicals are caused to penetrate the log from the surface to a considerable depth into the log and the fibers on and near the surface are freed. Also, to a certain degree, deeper down in the log, the fibers are softened and may be more easily detached therefrom when they become exposed at the surface. The sponging action of compression and decompression is such that fluids including the chemicals penetrate to a considerable depth in the log and as a considerable period of time elapses before it is ground, while the separate portions of the log pass between the different grinding stations, a considerable period of time elapses during which a chemical reaction may take place to soften, digest, or dissolve out the resins and/or lignins.

A further refinement of the machine is concerned with the engagement which is produced between the grinding wheel and the log wherein a straight line contact is accomplished. In performing this grinding action a single log will be reduced to a pulp in several steps as shown in FIGS. 1 and 2. The contact mentioned between the grinding wheel and the log produces the conical surfaces 24 on the log. To accomplish this the grinding wheel 11 is mounted in the machine and is then trued while in grinding position by moving a truing point across the surface of the wheel in a straight line along the line of contact between the log and the wheel, so that the surface generated on the grinding wheel 11 is of such curvature that the engagement of the wheel with the cylindrical log will produce the straight sided cone shape desired.

Referring to FIG. 4 an alternate bed construction is shown wherein a trough 30 is provided in which a rotatably driven worm screw 31 is disposed to form a pulp collecting system for use in association with the above described machine. The pulp separated from the log at each grinding station drops or is thrown downwardly into this conveyor mechanism to be delivered to the outlet end of the machine. With such a system it is feasible to produce a pulp of much higher consistency such as may be produced with a combined grinding and chemical pulping operation. The production of a high consistency pulp simplifies the subsequent pulp refining operations and minimizes the amount of energy needed to pump the pulp produced through the various stages.

As shown in FIGS. 3, 4, and 6, the casing surrounding the various grinding wheel stations, is provided with a window 32. The window is positioned relative to the grinding wheel such that some of the flushing fluid and pulp are continuously thrown against the underside of the window as the grinding action progresses. The window may be formed of blue glass and thus an approximation of the conventional blue glass pulp inspection test can be continuously performed to judge the quality of the pulp being produced at each station.

Referring to FIGURE 11, a different form of the machine is shown, wherein the logs are delivered to the various grinding throats 35, 36, 37, and are supported on a roller conveyor 38—38, 39—39, 40—40, 41—41, and 42—42 positioned to cooperate with the logs from the underside. The supporting rollers are rotatably mounted in pairs on suitable shaft and bearing means, the shaft having an axis disposed generally parallel to the axis of the log. As will be noted from an inspection of FIGURES 11 and 12, each of the pairs of rollers 38—38, 39—39, 40—40, 41—41, and 42—42, has a matching pair of rollers on the opposite side of the machine whereby a trough is formed to receive the logs and each group of rollers 38—38, 39—39, 40—40, 41—41, and 42—42, are situated between the grinding stations where the log diameter is constant. In this manner, each of the logs is supported so as to be free to rotate about its longitudinal axis and may be manually or positively pushed axially into engagement with the first grinding throat of the machine.

As will be explained more fully below, the conical grinding wheel 50 at the first station 35 engages the log with the surface of the wheel face in a generally tangential relationship with respect to the periphery of the log, to start the log rotating about its longitudinal axis. As the driven grinding wheel surface continues to move over the surface of the log, the complete reaction produced, effects an axial feeding of the log through the machine as long as the wheel rotates in contact with the log whereby the log is made to slide along the free wheeling support rollers 38—38, 39—39, 40—40, 41—41, and 42—42.

The grinding wheel is driven by any suitable means such as motor N shown in FIG. 12 and is rotatably supported in a vertically sliding head 51. The head is carried on bearing means 52 which slide in bearings 53 and head 51 is vertically adjustable to position wheel 50 to form throat 35, for example. The head 51 is carried at the lower end of piston rod 54 and nuts 55 and 56 may be positioned on rod 54 to fix the lowermost position of wheel 50.

The upper end of the piston rod 54 supports piston 57 which normally is held pressed against the bottom wall of cylinder 58 which forms a stop means, by air pressure in the top of the cylinder. Such air pressure may be supplied by any suitable means and normally wheel 50 is held in its lowermost position with sufficient pressure to form a relatively fixed dimension at throat 35 between conveyor wheels 39—39, 40—40, and the working face of wheel 50 such that the log is compressed at the contact points between all of the support rollers and the grinding wheel while the surface of the log is simultaneously abraded and subjected to longitudinal pulling action to feed the log along and strip the loosened fibers from the surface of the log. If any unusual situation is encountered, however, the wheel 50 may ride up on a hard spot in a log for example, or if the log is out of round the wheel may be lifted, yet a continuous grinding pressure is maintained between the wheel and the log by the air over piston 57.

It will be understood that the grinding wheels at each throat 35, 36, 37, may be supported by identical means such as have been described, and each wheel may be adjusted relative to the conveyor means to the position desired at each different grinding station. With a plurality of grinding stations the wheels may be adjusted to grind all sizes of logs from the largest to the smallest in a single pass through the machine. As shown in the drawings, the conical grinding wheel 50 disposed at each such station, has a relatively large diameter across the base of the cone as compared with the diameter of the log being worked upon. Further the surface of the grinding wheel is presented to the log such that referring to the cross sectional view of the log shown in FIGURE 13, and looking in a direction at right angles to the longitudinal axis of the log, the conical surface of the wheel is approximately tangent to the upper surface of the log. To accomplish this, the axis of the spindle 60 about which the griding wheel rotates, is disposed at an angle $a$ with respect to the vertical which is the same as the angle $a$ FIG. 14 between the base of the grinding wheel and the conical face thereof.

In order to effect a positive grinding action between the wheel and the log the face of the grinding wheel is presented to the log so that the diameter of the log is reduced as it passes longitudinally along under the wheel. It has been found that this relationship is best realized when the axis about which the grinding wheel rotates is inclined or canted toward the infeed end of the machine preferably at an angle approximately equal to one-half of the angle $a$ between the face of the wheel and the top thereof. This, in effect, causes the log to be engaged in a bight between the grinding wheel and the supporting rollers such that the surface of the conical wheel presses against the log to produce the desired grinding action.

It has been found in practice, however, that the exact angle at which the spindle is disposed is not too critical and within limits it may be varied to reduce the degree of grinding action on harder woods or the wheel may be made to dig in more when grinding softer woods. In this form of the machine the bight between the log and grinding wheel may be adjusted to control quality of end product. Likewise the speed of rotation may be varied and is not a critical condition but the logs must be rotated at a speed such that the system will have enough inertia to drive the logs such that they will continue to rotate at substantially the same speed even through soft spots or knots are encountered. I have ground poplar, spruce and fir logs of approximately 8″ in diameter taking off ½ of an inch at each station by rotating the log at a speed of approximately 1000 r.p.m. and a grinding wheel pressure of approximately 60 p.s.i.

In this connection also it has been found that the wheel surface should be pressed against the log by the above described means with a preselected uniform pressure which is dependent upon the type of wood being ground and the quality of fibers desired. With spruce a wheel pressure of approximately 60 p.s.i. has been found effective but with birch a higher pressure in the order of approximately 80 p.s.i. is needed. The grit size of the wheel determines the size of fibers or fiber bundles that will be produced. The drive speed must also be considered in connection with the degree of pressure required. The normal weight of the wheel and its support means together with the air pressure produced above the piston, tend to push the grinding wheel against the surface of the log. The stop against which the underside of piston 57 engages serves to position the wheel relatively such that the grinding wheel normally digs into the surface of the log only as deep as is consistent with the separation of the fibers which may be loosened by the mechanical longitudinal shredding action and the fluid loosening action, which tends to release the fibers during the alternate compression and decompression action produced on the surface of the log in the presence of the fluid, as it rotates. If, however, the log should be out of round or if a hard spot should be encountered such as a knot in the wood as explained above, the grinding wheel normally continues to grind in the same fixed position and, while the log continues to rotate at the same speed, its axial feed speed is slowed down until the knot is ground away or the high spot is leveled. But inertia of the log tends to carry it axially forward or the logs piled up behind drive the log forwardly despite the knot or high spot the wheel has passed. This construction causes the proper pressure to be exerted between the grinding wheel and the log at all times to properly work the surface of the log to strip off the fibers without at the same time producing any undue grinding action which would tend to break the fibers rather than pull them freely from the log.

In view of the mechanical agitation produced on the surface of the log by the means described above, it has been found that an acidic or alkaline solution may be used to advantage to produce pulp of desired characteristics. The solution can be sprayed from nozzles 61, see FIG. 12, against the surface of the wheels to keep them clean and the flow over the surface of the log to act upon the log. With the releasing action produced by such a dissolving step the fibers tend to pull loose easily due to the relatively longitudinal pulling action of each of the grinding wheels' surfaces in an axial direction. This combined loosening and grinding action as explained above strips the fibers from the log without causing any undue breaking thereof and a much higher quality fiber thus results.

Figure 13:
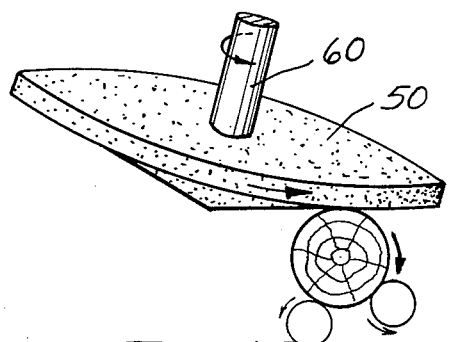
Figure 16:
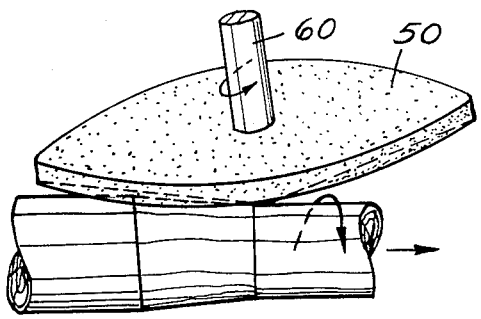

The positioning of the conical grinding surface with respect to the log, together with the direction of the rotation of the grinding wheel produces the results described above. As will be seen by reference to FIGS. 13, 15, and 16, the placement of the log on the free wheeling roller supports permits the log to rotate freely under the action of the grinding wheel which need be the only driven element of the machine. The contact of the outer periphery of the conical wheel with the upper surface of the log is designed to be such that as the log rotates under the driving action of the conical wheel, the desired pulling action between the surface of the wheel and the log is produced. This pulling action thus simultaneously pulls the fibers from the log and in doing so feeds the log axially along through the machine. The form of support rollers herein used in shown in FIG. 17 wherein pairs of smooth surfaced rollers 62, 63, 64 extend from one grinding station to another on opposite sides of the logs. Also it has been found that useful results are obtained when the right hand roller, referring to the view shown in FIG. 13, is centered on an axis higher than that which supports the left hand side of the logs.

In another form of the machine the roller means 39—39, 40—40, 41—41, and 42—42, as shown in FIG. 11, may be provided with a grooved surface which tends to retard the axial feeding action of the logs through the machine. This grooving is also operative to further work the surface of the log which is pressed thereagainst to promote the chemical solution action discussed above and it is suggested that such rollers may be used especially for supporting harder types of wood being converted to pulp.

The rotation of the conical grinding wheel in conjunction with the free wheeling roller support automatically coordinates the pulp producing action with the movement of the log by its own driving action and the contact is designed to minimize the grinding action while producing a maximum pulling force to separate the fibers from the surface of the log and feed the log on to the next grinding throat. The periphery of the log is thus reduced in a helical fashion to a desired depth at a single throat and the grinding action may be reproduced against the surface of the log in succeeding grinding stations, such as 35, 36, 37, and additional stations if needed, until substantially the entire meat of the log has been reduced to pulp.

The machine described with reference to FIG. 11 is put into operation when the wheels 50 are driven and the logs which have previously had the bark removed and are to be converted to pulp, are placed on conveyor rollers 38—38 to be fed longitudinally into the first grinding throat 35. As the logs are passed along from rollers 38—38 to rollers 39—39, the front end of the log is engaged against the under surface of the first grinding wheel 50 and the log immediately begins to rotate under the influence of the grinding wheel action as can best be seen in FIGS. 15 and 16. At this point the log is supported on the group of rollers 39—39 which are positioned as close as possible to the grinding station to provide effective support for the log and as the log rotates under the influence of the wheel, a fresh surface of the log is continuously presented to the grinding wheel. In some instances, while the end of the log is passing under the grinding wheel and across the space between wheels 39 and 40, the end of the log carried on rollers 38—38 may be held down from above by a suitably positioned resiliently supported roller 65 to prevent the free end of the log from being lifted from its position on support rollers 38—38. Hold down rolls may be positioned between each grinding throat if need be but preferably the stations are so close that the log is simultaneously engaged by two grinding wheels at least, at all times so that hold down means are not required at the intermediate stations.

In addition to causing the log to rotate, the action of wheel 50 against the surface of the log causes the log to be moved axially along to the next group of support rollers 40—40. The combined rolling and axial feeding action causes all of the peripheral surface of the log to come under the action of the grinding wheel 50 so that the surface layer of the log is converted to pulp by grinding and pulling action of the wheel against the surface of the log, the fibers being separated by a pulling action which is a component of the r.p.m. of the grinding wheel, the r.p.m. of the log and the axial feed of the log.

It will be noted that rollers 40—40 positioned to receive the log coming from the first grinding station are adjusted to cooperate with the reduced diameter of the log as it comes from grinding station 35 and the ground log is supported thereon with its axis substantially horizontal as it moves longitudinally through the machine to the second grinding station 36. The length of the logs fed into the machines is not critical as the wheels are all driven to produce the same rate of rotation on the log consistent with the diameter of the log at the particular station. The log moves continuously through the machine to the succeeding grinding stations 36, 37 to convert the log to pulp in the manner here taught.

It is, of course, apparent that the log may be subjected to a chemical solvent action at each grinding station as the pulp producing action proceeds. The pressure of the grinding wheel against the log supported on the conveyor means, produces localized areas where the surface of the log is agitated to promote the chemical solvent action which assists in loosening the fibers so that they may be more easily separated from the surface of the log at the several grinding stations in a relatively unbroken condition.

Preferably the chemical solution may be made to flush the log as the grinding proceeds so that the pulp slurry is formed under the most advantageous conditions. Additionally the solution itself may be sprayed against the surfaces of the several grinding wheels to keep them clean and eliminate the possibility of any of the grinding wheels burning the surface of the log.

I have used chemical solutions of sodium disulphate in 1% at 36° Baumé concentration, circulated at a given station at the rate of 60 gallons per minute through nozzle 61. Such fluid flowed over the logs which were being ground to a depth of ½ of an inch at each pass through a grinding station produced a pulp of 7 to 8% consistency. To produce such pulp a 15 H.P. motor was used and 21 H.P./ton of pulp was consumed.

In still another form of the invention an arrangement is provided for positively rotating and feeding the logs to be ground axially across the operative surface of an abrasive member which may be a straight-faced, a hyperboloid-shaped, or a conically shaped abrasive wheel rotated in a relatively opposite direction in comparison with the direction of rotation of the grinding wheel shown in the other forms of the machine. The logs may be fed axially in a horizontal direction, or in a vertical direction, or in an angular direction at an angle between the horizontal and vertical. The path of movement of the logs to be ground passes through the grinding zone contacting with the grinding member at an angle within the range of 10° to 25° preferably 15°.

A pulp grinding machine has been illustrated in the drawings FIGS. 18 to 30 in which the logs to be ground of indeterminate length are fed axially through a grinding throat formed by a plurality of spaced rotatable grinding wheels and a work support, such as, a plurality of spaced pairs of rotatable rollers. At least one roller of each set may be positively driven to impart a controlled rotary motion to the logs being ground. An axial feeding mechanism is provided for imparting a controlled axial feeding movement to the logs being ground. This mechanism comprises a link chain having spaced log engaging members arranged to engage the ends of successive logs so as to impart an axial feeding movement thereto. The depth of cut of the grinding wheels may be adjusted by regulating the rate of rotation of the work supporting rollers and by regulating the rate movement of the log feeding mechanism.

The machine comprises a base 70 which supports a plurality of spaced vertical frames 71, 72, 73, and 74, FIGS. 18 and 20. The frames 71, 72, 73, and 74, support a horizontally arranged frame 75 which in turn supports a plurality of pulp grinding wheels 80a, 80b, 80c, 80d, 80e, 80f, 80g, 80h, 80i, and 80j, in a manner to be hereinafter described. The grinding wheels are each supported on a wheel spindle 90a, 90b, 90c, 90d, 90e, 90f, 90g, 90h, 90i, 90j, respectively. The wheel spindles 90 are each supported in a pair of spaced bearings 91 and 92, FIGS. 20 and 24. The bearings for each of the spindles are supported by yoke-shaped frames 93a, 93b, 93c, 93d, 93e, 93f, 93g, 93h, 3i, 93j, respectively having an upwardly extending integral feed screw 94a, 94b, 94c, 94d, 94e, 94f, 94g, 94h, 94i, 94j, respectively. Each of the feed screws pass through a clearance hole formed in the horizontal frame 75. A pair of collars 95 and 96, FIGS. 19 and 20, are screw threaded onto each of the feed screws 94 below the frame 75. A second pair of collars 97 and 98 are threaded onto each of the feed screws 94 above the frame 75.

By manipulation of the collars 95–96 and 97–98, the feed screws 94 may be adjusted in a vertical direction so as to facilitate positioning the operative face of the grinding wheel in a predetermined position relative to the axis of the logs being ground. Also the wheel spindles 90 together with the grinding wheel 80 may be swiveled in a horizontal plane so as to position the axis of the grinding wheel spindle 90 so that a midplane passing through the grinding wheels is at an angle of 10° to 25° relative to the axis of the logs being ground. The grinding wheels 80 are preferably formed with an hyperboloid-shaped operative face 100, FIGS. 24, 25, 26, so that when adjusted to an angular position, fibers or bundles of fibers are removed from the logs in a helical path as the logs pass axially through the machine. Each of the grinding wheel units is identical with that just described and consequently have not been illustrated and described in detail.

The wheel spindles 90 are each provided with a pair of clamping flanges 101 and 102, FIG. 24, together with lock nuts 103 and 104 by means of which the wheels may be clamped in position on the spindles 90.

An independent driving mechanism is provided for each of the grinding wheels comprising electric motors 105a, 105b, 105c, 105d, 105e, 105f, 105g, 105h, 105i, 105j, FIG. 5. The motors are provided with motor shafts 106a, 106b, 106c, 106d, 106e, 106f, 106g, 106h, 106i, 106j, which are connected at one end by a flexible coupling 107a, 107b, 107c, 107d, 107e, 107f, 107g, 107h, 107i, 107j, with a drive shaft 108a, 108b, 108c, 108d, 108e, 108f, 108g, 108h, 108i, 108j, and at the other end with another flexible coupling 107k, 107l, 107m, 107n, 107o, 107p, 107q, 107r, 107s, 107t, connected to one end of the wheel spindle 90. Each of these driving connections is identical in construction and consequently will not be described in detail. The drive shafts 108a, 108b, 108c, 108d, 108e, 108f, 108g, 108h, 108i, 108j, are provided to connect the driving motors 105a, 105b, 105c, 105d, 105e, 105f, 105g, 105h, 105i, 105j, at the respective wheel spindles. By providing a flexible driving connection the grinding wheels may be readily swiveled to the desired angle.

Power consumed with the present grinding machine is much less than used by the conventional pulp grinder, and is approximately 300 kilowatt hours per long ton of fiber produced with poplar logs and 900–950 kilowatt hours with pine. The conventional type pulp grinding machine utilizes 1300–1400 kilowatt hours per ton of fiber produced. We have estimated that power costs are less than 40% of the power consumption for a conventional standard pulp grinding operation for an equivalent amount of pulp produced. The usual pulpstone uses 0.9 to 1.1 kilowatt hours per 220 lbs. of pulp, with variations depending upon the kind of wood used and the condition of the grinding machine. Tests of my machine indicate that, including the refining step, I use approximately .5 kilowatt hour per 220 lbs. of finished pulp. A roller support is provided for supporting the logs to be ground as they pass axially through the machine. A grinding throat is provided between the grinding wheel and the supporting rollers which serves to maintain the axis of the logs in a substantially rectilinear path as they pass in either a horizontal, a vertical, or an angular direction through the machine. A plurality of roller brackets, FIGS. 18, 20, and 21, 109a, 109b, 109c, 109d, 109e, 109f, 109g, 109h, 109i, 109j, 109k, are provided on one side of the grinding throat. A plurality of roller brackets 110a, 110b, 110c, 110d, 110e, 110f, 110g, 110h, 110i, 110j, 110k, 110l are provided on the opposite sides of the grinding throat. These brackets serve as supports for a plurality of rotatable log supporting rollers and are all identical in construction, consequently only one of these brackets has been shown in detail. The bracket 109k, FIG. 20, serves as a support for a pair of rollers 111k. Similarly the bracket 110k, FIGS. 20 and 21, which is opposed to the bracket 109k is provided with a rotatable shaft 113, FIG. 21, which is supported by a pair of spaced anti-friction bearings 114 and 115 carried by the bracket 110k. The shaft 113 serves as a support for a pair of supporting rollers 116k. A sprocket 118k, FIG. 21, is fixedly mounted on one of the rollers 116k and a similar sprocket is mounted on one of the rollers 111k supported by the bracket 109k by means of which sprockets the rollers 109k and 116k may be positively driven.

Each of the roller brackets 109a, 109b, 109c, 109d, 109e, 109f, 109g, 109h, 109i, 109j, 109k, and 110a, 110b, 110c, 110d, 110e, 110f, 110g, 110h, 110i, 110j, 110k are adjustably supported on the base 70. The brackets are each provided with a pair of elongated slots 120k and 121k, FIG. 21, by means of which the brackets may be adjustably clamped onto the base 70. By providing the elongated slots, the brackets may be adjusted transversely toward each or from each other to provide the desired spacing between the rollers 111a, 111b, 111c, 111d, 111e, 111f, 111g, 111h, 111i, 111j, 111k, and 116a, 116b, 116c, 116d, 116e, 116f, 116g, 116h, 116i, 116j, 116k.

It is desirable to maintain the axes of the logs in a predetermined plane either horizontally, vertically, or angularly as they pass through the grinding throat. It is therefore desirable to adjust the brackets toward or away from each other and also to interpose shims between brackets and the base 70 to progressively raise the brackets as may be necessary so that the grinding throat formed between each of the grinding wheels 80 and the rollers supporting the logs may be progressively decreased in size as the logs pass through the machine. Logs 122 to be ground are supported on the rollers 111a and 116a as they move into the entering end of the machine, as shown in FIGS. 18 and 19.

A driving mechanism is provided for imparting a rotary motion to the sprockets associated with at least one set of the rollers 111 or 116 carried by each of the roller brackets. This driving mechanism comprises a motor 130 which drives a sprocket 131. The sprocket 131 is connected by a link chain 132 with a sprocket 133, FIG. 18, mounted on the right hand end of a rotatable shaft 134. The shaft 134 is provided with a plurality of spaced sprockets, 135a, 135b, 135c, 135d, 135e, 135f, 135g, 135h, 135i, 135j, 135k, 135l. The sprockets 135 are connected by link chains 136a, 136b, 136c, 136d, 136e, 136f, 136g, 136h, 136i, 136j, 136k, and 136l, with sprockets 118, FIG. 21, to drive all of the pairs of rollers supported in the roller sprockets 110.

The shaft 134 also supports a sprocket 140, FIG. 18, which is connected by a link chain 141 with a sprocket 142 mounted on the right hand end of the rotatable shaft 143. The shaft 143 is provided with a plurality of sprockets 144a, 144b, 144c, 144d, 144e, 144f, 144g, 144h, 144i, 144j, 144k, 144l, 144m. The sprockets 144 are similarly connected by link chains 145a, 145b, 145c, 145d, 145e, 145f, 145g, 145h, 145i, 145j, 145k, 145l. These link chains are connected to a sprocket to drive each of the pairs of rollers supported by the roller brackets 109a, 109b, 109c, 109d, 109e, 109f, 109g, 109h, 109i, 109j, 109k, 109l. It will be readily apparent from the foregoing disclosure that the motor 130 serves to impart a rotary motion to the shafts 134 and 143 so as to impart a rotary motion to the work supporting rollers carried by all of the roller brackets 109 and 110.

It should be noted that the work supporting and driving rollers 111 and 116 engage the peripheral surface of the logs passing through the machine so that the logs are rotated at the same surface speed as the driving rollers. As the log progresses through the machine it is reduced in diameter and in order to maintain a uniform grinding action in this form of the machine, it is desirable to speed up the rotary motion of the log being ground. Due to the fact that the logs being ground are driven at the surface speed of the supporting rollers, the rotary speeds of the log are automatically increased since the rotatable positively driven rollers impart a substantially constant surface speed to the logs as they pass through the machine. Due to the reduced diameter of the logs, the r.p.m. of the logs will be gradually increased as the logs progress from the entry end at the left hand end of the machine (FIGS. 18 and 19) to the exit end or the right hand end thereof.

In order to provide a predetermined axial feeding movement to the logs so as to provide a desired depth of cut, a positive driving mechanism is provided comprising a motor 150 and a motor shaft 151 which supports a sprocket 152. The sprocket 152 is connected by a link chain 153 with a sprocket 154 which is mounted on a rotatable shaft 155. The shaft 155 is provided with a large sprocket 156 which is connected by a link chain 157 with a sprocket 158 which is mounted on a rotatable shaft 159. The link chain 157 is provided with a plurality of spaced work driving members 158a, 158b, 158c, 158d, 158e, and 158f which are spaced apart by distances substantially equal to the length of the logs being ground.

The work driving members 158a, 158b, 158c, 158d, 158e, and 158f are supported by a plurality of brackets 159a, 159b, 159c, 159d, 159e, 159f which are fixedly mounted on spaced links of the link chain 159 (FIG. 19). Each of the brackets 159 supports a short shaft 160, FIG. 23, which in turn supports a plurality of spaced anti-friction bearings 161 so as to form anti-friction bearing supports for the work driving members 158. When the motor 150 is started, a clockwise movement of the link chain 157 is initiated which serves to move the log driving members 158 into engagement with the left hand end of the logs to be ground and to impart an axial feeding movement thereto. By regulating the speed of movement of the link chain 157, the desired depth of cut of the grinding wheels 80 may be obtained to remove unbroken fibers or bundles of fibers from the log 122.

The link driving chain 157, FIG. 22, is provided with rollers 165 and 166 at spaced intervals along the chains which ride in guideways 167 and 168, respectively, which are fixedly mounted relative to the base 70 to form a slide support for the driving side of the chain 157.

The grinding wheels 80a, 80b, 80c, 80d, 80e, 80f, 80g, 80h, 80i, and 80j are each partially surrounded by a wheel guard 169a, 169b, 169c, 169d, 169e, 169f, 169g, 169h, 169i, and 169j.

It is desirable to provide a coolant fluid system to supply coolant fluid to the grinding wheels and the logs being ground to cool the grinding wheel and the log being ground and also to wash away or flush the wood fibers from the grinding zone. The coolant fluid system comprises a fluid supply pipe 170, FIG. 19, which receives fluid from a suitable source. A control valve 171 is connected between the pipe 170 and a longitudinally extending pipe 172 which extends along the horizontal frame 75. The pipe 172 is connected at each grinding wheel station by a control valve 173 with a pipe 174 to convey coolant fluid through the respective wheel guards 169a, 169b, 169c, 169d, 169e, 169f, 169g, 169h, 169i, and 169j, to flood the grinding wheel 80a, 80b, 80c, 80d, 80e, 80f, 80g, 80h, 80i and 80j and through a pipe 175 and nozzle 176 to supply coolant fluid to the grinding wheels 80a, 80b, 80c, 80d, 80e, 80f, 80g, 80h, 80i, and 80j and the log 122 at the grinding zone.

If desired, a conically-shaped grinding wheel 180 such as shown in FIGS. 27, 28, 29, and 30 may be employed. The grinding wheel 180 is a plate mounted wheel in which the grinding wheel is mounted on a backing plate 181 which is in turn supported by a wheel spindle 182. The wheel spindle 182 is supported in suitable spindle bearings (not shown). As shown in FIG. 30, the grinding wheel 180 is supported on a wheel spindle 183 which is supported in spindle bearings in a manner substantially the same as shown in FIG. 24.

The axis of the wheel spindle 182 is preferably arranged in an angle of 80° to 65°, preferably 75°, relative to the axis of the logs 122 being ground so that the frusto-conical wheel face 184 grinds the log 122 in a helical path as the logs are fed axially and rotated relative thereto. The conically-shaped grinding wheel 180 and the log 122 to be ground may be arranged so that the logs 122 are fed axially in either a vertical, a horizontal or in an angular direction. A plurality of conical-shaped grinding wheels 180 may be utilized, if desired, and arranged spaced from each other longituudinally relative to the logs 122 being ground or may be angularly positioned about the periphery or circumference of the log. The operative frusto-conical face 184 of each of the grinding wheels 180 grinds the logs in a helical path removing strings and bundles of unbroken relatively long fibers therefrom.

As the logs 122 reach the righthand end of the machine, FIG. 19, they are reduced to a relatively small diameter. To disintegrate this small end of the logs, a grinding wheel 186 is positioned directly below the grinding wheel 80j and is peripherally opposed thereto. The wheel 186 is mounted on a wheel spindle 187 which is connected by a universal joint 188, FIG. 5, with a drive shaft 189. The shaft 189 is connected by a universal joint 190 with a motor shaft 191 of a driving motor 192.

If desired a chemical solution such as sulfites, bisulfites, caustic and other chemicals conventionally used in the paper industry, may be passed through the coolant system to thoroughly impregnate the surface of the logs being ground and thereby facilitate removal of fibers therefrom. A solution, such as sodium hydroxide one gram of caustic per liter of water, may be utilized so that clumps or bundles of fibers may be readily removed from the log being ground. The chemical action both swells the fibers and loosens them in bundles, or dissolves or softens the binding lignins or resins. If chemicals are used in the coolant fluid and the system is enclosed so as to immerse the logs and a portion of the grinding wheels, the chemicals will thoroughly impregnate the wood fibers as they are removed from the logs. Such a procedure serves to eliminate the necessity of an additional chemical treatment step, either of the logs before grinding or the fibers and/or pulp after grinding.

It will thus be seen that there has been provided by this invention several forms of an apparatus in which the various objects hereinabove set forth together with many thoroughly practical advantages are successfully achieved.

I claim:

1. A wood pulp forming machine for reducing a debarked log to pulp comprising a plurality of rotatably driven abrasive grinding wheel stations, a support for the grinding wheel at each of said stations, a generally conically shaped grinding wheel rotatably mounted at each station, a conveyor to carry said log longitudinally generally along a line at each station through the machine, each of said supports having bearing means for rotatably supporting said wheels, said bearing means of each of said supports having an axis about which the respective wheel at each station rotates, said axis being removed from and disposed at an angle with respect to said longitudinal line at each station, said grinding wheel being positioned relative to the log at said station such that the generally conical surface of the wheel presses against the log's periphery to reduce the diameter of the log in a conical shape spirally from one end to the other by pulling fibers free from the log, said conveyor including a rotatably driven supporting means to engage and have points of contact with the log in an area of the cone produced by each grinding wheel, said supporting means being crowned at each of said points of contact and having a spiral groove cut in each crowned portion to effect controlled forward feed of the log through the machine.

2. A wood pulp forming machine for reducing a debarked log to pulp comprising a plurality of rotatably driven abrasive grinding wheel stations, a support for the grinding wheel at each of said stations, a generally conically shaped grinding wheel rotatably mounted at each such station, a conveyor to carry said log longitudinally generally along a line at each station through the machine, each of said supports having bearing means for rotatably supporting said wheels, said bearing means of each of said supports having an axis about which the respective wheel at each station rotates, said axis being removed from and disposed at an angle with respect to said longitudinal line at each station, said grinding wheel being positioned relative to the log at said station such that the generally conical surface of the wheel presses against the log's periphery to reduce the diameter of the log in a conical shape spirally from one end to the other by pulling fibers free from the log, said conveyor including a rotatably driven supporting means to engage and have points of contact with the log in an area of the cone produced on the log by each grinding wheel, said supporting means being crowned at each of said points of contact and having a spiral groove cut in each crowned portion to effect controlled forward feed of the log through the machine, and the diameter of each of said crowned portions decreasing in proportion to the decrease in diameter of the log whereby to maintain the same r.p.m. of the log even though it may span a distance longer than the distance between one or more stations and be in contact with several grinding wheels.

3. A wood pulp forming machining for reducing a debarked log to pulp comprising a plurality of rotatably driven abrasive grinding wheel stations, a generally conically shaped grinding wheel rotatably mounted at each station, a conveyor to carry said log longitudinally through the machine, said grinding wheel being positioned relatively to the log at said station such that the generally conical surface of the wheel presses against the log's periphery to reduce the diameter of the log in a conical shape spirally from one end to the other by pulling fibers free from the log, said conveyor means including a rotatably driven supporting means to engage the log in an area of the cone produced by each grinding wheel, said rotatable support means being porous and a source of wood softening chemical solution in contact with said supporting means to fill said pores with fluid.

4. A wood pulp forming machine for reducing a debarked log to pulp comprising at least one rotatably driven grinding wheel station, a generally conically shaped abrasive grinding wheel rotatably mounted at each such station, a fluid spray means to flush the surface of the log at any such grinding station, a conveyor to carry said log longitudinally through the machine, said grinding wheel being positioned relative to the log at said station such that the generally conical surface of the wheel presses against the log's periphery to reduce the diameter of the log spirally from one end to the other by pulling fibers free from the log, a casing for enclosing said station including the grinding wheel, said casing having a blue glass window therein, said window being disposed in said casing in a position to have a representative portion of the pulp and fluid spray thrown against the inner side thereof whereby a continuous inspection of the quality of the resulting pulp can be made.

5. A wood pulp forming machine adapted to disintegrate debarked logs comprising conveyor means for supporting the log, said conveyor means having an infeed and being adapted to rotatably and slidably support said logs for delivery through the machine lengthwise generally along a line, a plurality of conically shaped abrasive grinding wheels adapted to engage the logs at spaced points along said conveyor means, supported means for rotatably carrying said wheels, and means to drive said wheels to rotate about a relatively fixed axis, each of said wheels being disposed to successively engage the periphery of each of said logs, said wheels each engaging the logs along a path spaced from said line, said conical surface of each of said wheels frictionally engaging the surface of the log with sufficient pressure to effect the rotation of the log and lengthwise feeding of the log along the conveyor means, the path along which the log is engaged by the conical surface of the wheel being canted toward the infeed and relative to the log surface at an angle to reduce the diameter of the log, whereby to produce a combined grinding and feeding action by driving the wheel, which pulls the fibers of the log free.

6. A wood pulp forming machine adapted to disintegrate debarked logs comprising a conveyor means having an infeed and means for supporting the logs, said conveyor means being adapted to rotatably and slidably support said logs for delivery through the machine lengthwise, a plurality of conically shaped abrasive grinding wheels adapted to engage the logs at spaced points along said conveyor means, support means for rotatably carrying said wheels, means to drive said wheels to rotate about a relatively fixed avis, said axis being inclined at an angle to the vertical and a projection of said axis passing wholly outside the space occupied by said log, said axis being inclined somewhat toward the infeed end of the machine, each of said wheels being disposed to successively engage the periphery of each of said logs, said wheels each engaging the logs along a line spaced from said axis, said conical surface of each of said wheels frictionally engaging the surface of the log with sufficient pressure to effect the rotation of the log and axial feeding of the log along the conveyor means, and the log engaging line on the conical surface of the wheel being canted relative to the log surface at an angle of between about 10° to 25° to reduce the diameter of the log, whereby to produce a combined grinding and feeding action by driving the wheel which pulls the fibers of the log free.

7. A method of forming wood pulp by grinding a debarked log at a plurality of succeeding stations comprising supporting a log on a plurality of roller supports having a localized contact with the log while feeding it axially past a plurality of abrasive grinding wheels, rotating both the wheels and the log, pressing the rotating log with the grinding wheels against the localized contact of the supports to produce localized compressed areas at spaced points which in effect travel around the periphery of the log, flooding the surface of the log with fluid so that when the supported area of the log passes the supporting means and the compression is relieved at said localized areas the fluid will flow into the wood below the log's surface, and grinding the fluid soaked portion of the log at each of said succeeding stations to form a pulp, said grinding being facilitated due to the softening action of the sub-surface fluid absorbed into the log.

8. A method of forming wood pulp by grinding a debarked log at a plurality of succeeding stations comprising supporting a log on means having localized contact with the log while feeding it axially at a given velocity past a plurality of abrasive grinding wheels, contacting the log's surface with a portion of the wheel moving generally in the same direction as the axial movement of log, rotating both the wheels and the log, pressing the rotating log with the grinding wheels against the supports to produce compressed areas at spaced localized points which in effect travel around the periphery of the log, flooding the surface of the log with fluid so that when the supported area of the log passes the localized supporting means and the compression is relieved at said localized area the fluid will flow into the wood below the log's surface, and rotating the grinding wheels at a rate of revolutions per minute to move the wheel surface relative to the log surface at a somewhat faster velocity for grinding the fluid soaked portion of the log at said succeeding stations by pulling the fibers lengthwise from the log to form a pulp, said grinding being facilitated due to the softening action of the sub-surface fluid absorbed into the log.

9. A ground wood pulp making machine comprising a grinding station including a driven abrasive grinding wheel means and conveyor means to rotate and feed a log at said grinding station, said log having a peripheral surface from which the bark has been removed, said peripheral surface lying over a substrata including natural fibers and their natural binders, said conveyor including support means positioned adjacent said grinding station for engaging the log at spaced points on its periphery leaving the remainder of the periphery disengaged, mounting and driving means for said abrasive grinding wheel means, said mounting means being positioned to hold said wheel against the surface of said log, said wheel means and said support means rotatably engaging the log under pressure as it is being rotated about its longitudinal axis and ground at the grinding station whereby the portions of the substrata and respective engage spaced peripheral points of the log are caused to be compressed as the log is engaged between said abrasive grinding wheel means and the support means under said pressure, shower means to flood the periphery of the log with a fluid stream at least some of which fluid enters the substrata of the log, the compression produced by the log's surface engaged between said grinding station and support means serving to squeeze out the fluid that has previously entered the substrata of the log in the vicinity of said engaged spaced points on the periphery of the rotating log as the points roll into contact with the support means and thereafter a portion of the fluid medium flooding the periphery is drawn into those other portions of the substrata which expand and become depressed after the engaged points of the peripheral layer roll out of contact with the support means, said fluid that is drawn into the substrata of the log beneath the disengaged points on the periphery of the log tending to soften and dissolve some of said natural binders, and said abrasive grinding wheel means being carried by said mounting means to be positioned relative to said support means and driven to be rotated at such a speed as to cause the abrading surface of the abrasive grinding wheels means to move over the surface of the log to liberate individual fibers and bundles of fibers from the log surface after the natural binders in the substrata have been contacted by the fluid drawn into the substrata.

10. A machine according to claim 9 comprising a plurality of said grinding station means positioned to receive a log fed axially therethrough whereby to substantally effect a complete grinding up of successive logs fed therethrough to liberate bundles of fibers and individual fibers.

11. A machine according to claim 9 wherein the abrasive grinding wheel means is of conical shape and is rotatably mounted in said mounting means to rotate about an axis which is disposed relative to said grinding station to produce a generally conical pattern on the periphery of the log, the conical pattern having a side on the periphery of the log and a center line generally coinciding with the longitudinal axis of the log and in which the side of the cone is at an angle of from 10° to 25° with respect to the center line of the conical pattern, said conical pattern being produced as the abrasive grinding wheel means operates to liberate said individual fibers and bundles of fibers in a substantially helical path from the log.

12. A machine according to claim 11 wherein the abrasive grinding wheel has a conical shape having a base and axial dimension, and wherein said base dimension of the cone is substantially longer than the axial length thereof, and said conical abrasive wheel being canted in at least two directions relative to the peripheral surface of the log to produce said conical pattern on the periphery of the log and to effect rotation and feeding of the log past the grinding station means.

13. A machine according to claim 11 wherein said conveyor includes means for engaging the logs for axial movement and driving means for said conveyor for forcing the log into the conical grinding station established by the conical relationship of the abrasive grinding wheel and the support means.

14. A method of separating wood fibers from their natural binders in a debarked log having a peripheral surface and substrata comprising first flooding the surface of the log with a fluid and then cyclically compressing and decompressing the surface of the log to work the surface in the presence of said fluid to cause the fluid to flow into and be squeezed out of the substrata with each decompression and compression cycle, said fluid tending to soften and dissolve the natural binders holding the fibers in the log and thereafter contacting the worked and softened surface of the log with a driven abrasive grinding wheel to wipe individual wood fibers and bundles of fibers from the previously softened portion of the log.

15. The method according to claim 14 wherein a localized area of a log is engaged under pressure with a roller means to work the surface layers of the log, said roller means being moved longitudinally and peripherally over the surface of the log in a generally spiral direction prior to the performance of the grinding step.

16. The method according to claim 15 wherein the individual fibers and bundles of fibers are liberated from the log by grinding the log in a helical pattern.

17. The method according to claim 16 accomplished by feeding the log axially into the grinding wheel while rotating the log.

References Cited by the Examiner

UNITED STATES PATENTS 1,633,733  6/1927  Fish _____ 162—26

FOREIGN PATENTS

| | | |
|---|---|---|
| 359,688 | 9/1922 | Germany. |
| 529,087 | 7/1931 | Germany. |
| 542,904 | 1/1932 | Germany. |
| 76,235 | 1/1933 | Sweden. |

DONALL H. SYLVESTER, *Primary Examiner.*

RICHARD D. NEVIUS, MORRIS O. WOLK, *Examiners.*

H. CAINE, *Assistant Examiner.*